Nov. 10, 1936.　　L. W. EGGLESTON　　2,060,185
FLOW CONTROL MEANS
Filed June 16, 1933　　2 Sheets-Sheet 1
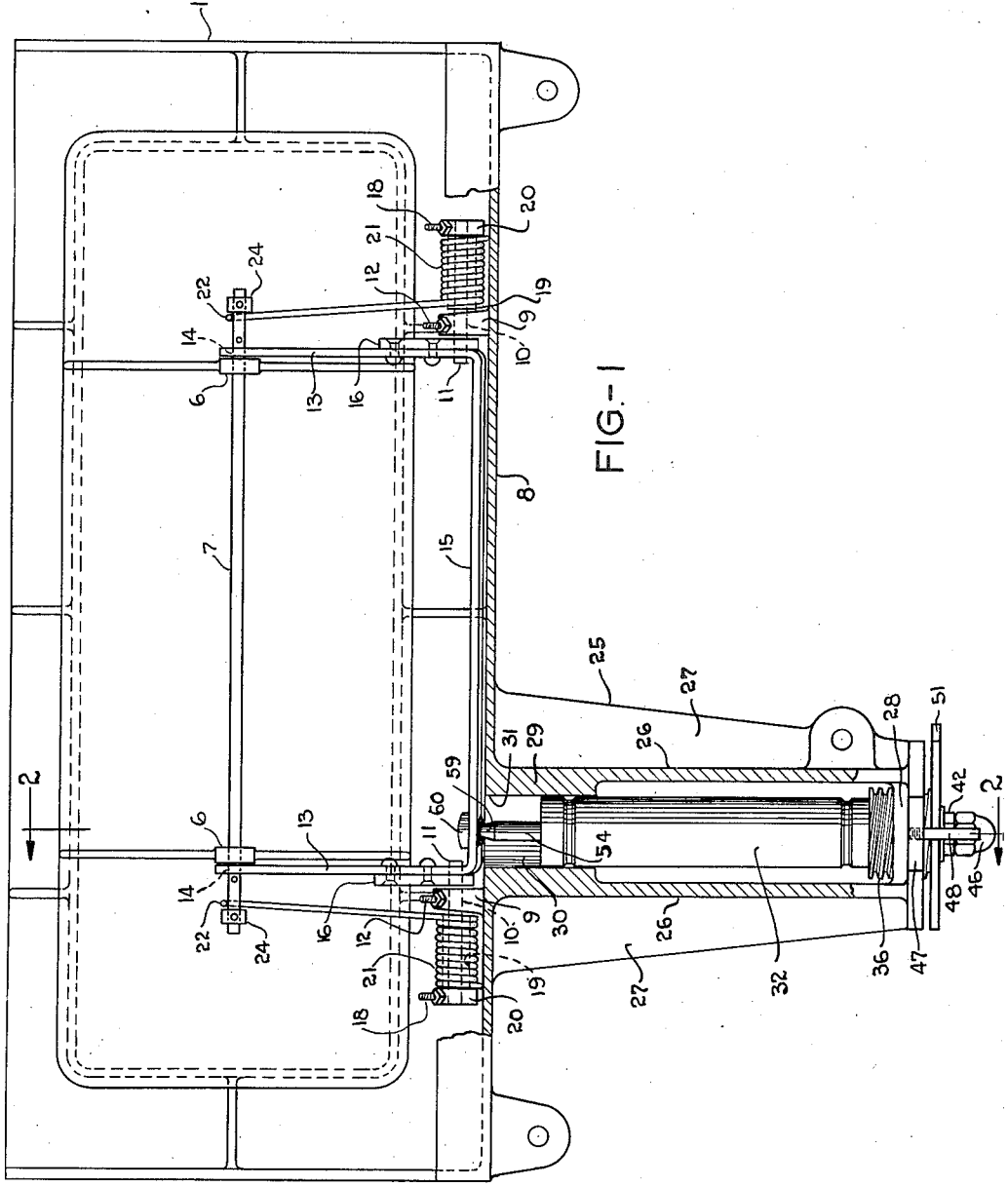
INVENTOR
Lewis W. Eggleston
BY
his ATTORNEY Nov. 10, 1936. L. W. EGGLESTON 2,060,185
FLOW CONTROL MEANS
Filed June 16, 1933 2 Sheets-Sheet 2

INVENTOR
Lewis W. Eggleston
BY
his ATTORNEY

UNITED STATES PATENT OFFICE 2,060,185

FLOW CONTROL MEANS

Lewis W. Eggleston, Detroit, Mich., assignor to Detroit Lubricator Company, Detroit, Mich., a corporation of Michigan Application June 16, 1933, Serial No. 676,061

18 Claims. (Cl. 236—99)

My invention relates to new and useful improvements in control devices, and more particularly to a device or apparatus for automatically regulating the flow of fluids, such as air or other gases.

The invention is particularly adapted for use in connection with refrigerating apparatus employing a refrigerating medium, such as solid carbon dioxide, in which it is desired to control the flow of the carbon dioxide gas into a space or compartment to be cooled or refrigerated.

An object of my invention is to provide a novel valve or damper control means which may be operated automatically.

Another object is to provide an automatic means, such as a thermostat, for regulating or adjusting the valve or damper control means.

Another object is to provide novel means for regulating the operation of the automatic means.

The invention consists in the improved construction and combination of parts, to be more fully described hereinafter and the novelty of which will be particularly pointed out and distinctly claimed.

In the accompanying drawings, to be taken as a part of this specification, I have fully and clearly illustrated a preferred embodiment of my invention, in which drawings—

Figure 1 is a top plan view of an apparatus embodying my invention, and having certain parts broken away for clarity of illustration;

Figure 3:
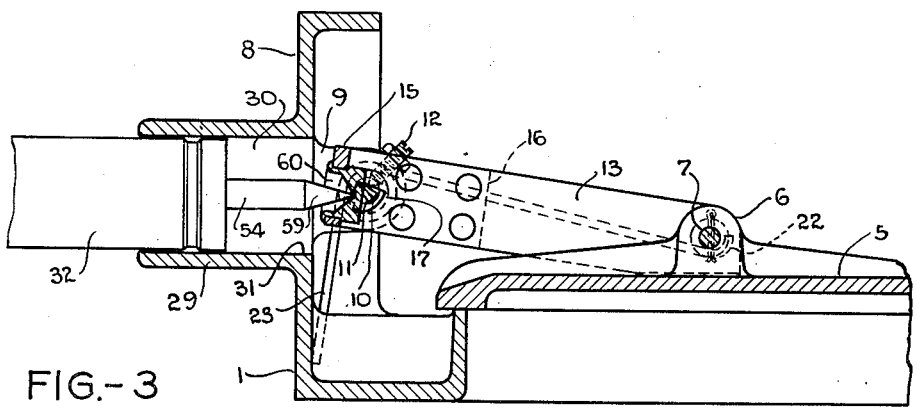
Fig. 3 is an enlarged detail view in section, and also taken on the line 2—2 of Figure 1.

Referring to the drawings by characters of reference, 1 designates, generally, a supporting frame including a base member or plate 2, preferably of metal and substantially rectangular, adapted to be positioned in or to close an aperture in a partition or wall of a refrigerating apparatus or system. Through the member 2 there is a flow opening or aperture 3, also preferably rectangular and surrounded by a continuous flange 4 extending upwardly from the member 2 and providing a valve port. Flow through the opening 3 is controlled by a valve or closure member 5, preferably a substantially rectangular plate which seats at its periphery on the flange 4. On the valve member 5 positioned substantially in the longitudinal center line thereof are spaced bearing blocks or bosses 6 provided with aligned apertures through which a bearing rod or shaft 7 extends. Extending upwardly from one edge of the base member 2 there is a lateral supporting flange or member 8 having longitudinally spaced, substantially horizontal bearing posts 9 projecting therefrom toward the valve member. The posts 9 are provided with aligned apertures 10 in each of which a bearing rod or member 11 is supported. Each of the members 11 is preferably substantially triangular in transverse cross-section to provide at their inner or opposed ends a knife-edge bearing or fulcrum which is directed upwardly and toward the flange 8. The members 11 are held in this position by set screws 12 which extend at their inner ends into the apertures 10 and are supported in the posts 9. Pivotally supported on the shaft 7 there are lever arms 13, each of which is provided with a bearing aperture 14 at one end through which the shaft 7 extends. The other ends of the arms 13 are rigidly joined by a cross member 15 extending substantially parallel to the flange 8. Each of the arms 13 is provided adjacent the cross member 15 with a reenforcing bearing plate 16 secured to the outer face of the arm members adjacent the cross member 15. Through each of the members 16 and arms 13 adjacent their juncture with the cross member 15 there is a bearing aperture 17, preferably substantially in the form of a quadrant to provide bearing notches seating downward on the knife edges of the bearing members 11. Secured by set screws, or the like, 18 on the outer ends of the members 11 which project oppositely to each other from the posts 9, there are sleeve members 19 having end flanges 20, preferably integral therewith. Surrounding each of the sleeve members 19 and positioned between the posts 9 and the flanges 20 there are helical coil springs 21, each of which has one end 22 extending into underlying engagement with the outer ends of the shaft 7, and having the other end 23 extending downward and engaging the flange 8. Collars 24, fixed on the ends of the shaft 7, serve to prevent the spring ends 22 from sliding longitudinally off of the ends of the shaft. The springs 21 are under tension but are of insufficient strength to raise the valve member 5 from its seat, their function being to partly overcome the force of gravity acting to close the valve member and thereby to assist the automatic valve opening means, to be described.

Projecting laterally from the supporting flange 8 and substantially parallel to the base member 2 there is a supporting member 25 having substantially parallel spaced supporting arms 26, preferably provided with reenforcing webs 27, and which are rigidly joined at their free ends by a plate or abutment member 28. Also projecting from the flange 8 there is a sleeve member 29 positioned between and extending longitudinally of the arms 26. The sleeve member 29 is rigid with the arms 26 and preferably formed integral therewith, and has its bore 30 serving as a guideway. Through the flange 8 there is an aperture 31 which registers with the bore 30, and which aligns with the cross member 15 adjacent one of the lever arms 13. Positioned between the arms 26 is a tubular, substantially cylindrical casing 32 which is reciprocably and rotatably supported at one end in the bore 30. The end of the casing within the sleeve 29 is provided with an internal annular flange or ring member 33 which is secured and sealed to the casing wall. Within the casing 32 there is an expansible-collapsible, circumferentially corrugated, resilient element or metal bellows member 34 which is secured and sealed at one end to the annular flange 33. The other end of the bellows member 34 which extends substantially to the opposite end of the casing is closed and sealed by a head or end wall 35. This other end of the casing 32 is closed and sealed by a plug or closure member 36 which is substantially cylindrical extending into the casing, as at 37, and having its portion which extends out of the casing externally screw-threaded, as at 38. Through the plate member 28 there is an internally screw-threaded aperture 39 in which the plug member 36 is adjustably screw-threaded, the plug member extending through the aperture 39. The outer end of the plug member 36 which projects through the plate 28 has a concentric extension 40 which receives a substantially circular indicator and adjusting plate 41, and which is held thereon by a nut 42. Longitudinally through the extension 40 and plug 36 there is a filling opening or bore 43 by which the chamber 44 within the casing 32 and around the bellows member 34 is charged with a suitable expansible fluid. The outer end of the bore 43 is preferably provided with a filler tube 45 which is closed and sealed after the chamber 44 is charged with the expansible fluid. A cap nut 46 threaded onto the extension 40 encloses the filler tube 45 and protects the same from injury. The plate member 28 has a projecting portion 47 which extends beyond the circumference of the plate 41 and carries a pin or stud 48 which projects transversely to the plate 41 adjacent the circumferential edge thereof, and which serves as a reference or indicator member for cooperation with the plate 41. The circumferential edge portion of the plate 41 has a plurality of adjacent apertures 49 therethrough. The apertures 49 are adapted to receive a pin or stud 50 removably threaded into the plate member 28 and positioned in the radial line of the reference member 48. The pin 50 may be removed and then repositioned in any of the apertures 49 which is brought into registry with the reference member 48 and be screwed into the plate member 28 to lock or hold the plate 41 and the plug member 36 against movement. The plate 41 may be provided with a circumferential projection 51 serving as a hand grip for rotary adjustment of the plate 41 when the pin 50 has been removed. Movement of the bellows member 34 is transmitted to the valve member 5 by means of a plunger which comprises a tubular member 52 containing a helical coil spring 53 which resiliently supports a thrust member 54 guided for reciprocation in the bore of the tubular member and projecting therefrom.

Figure 2:
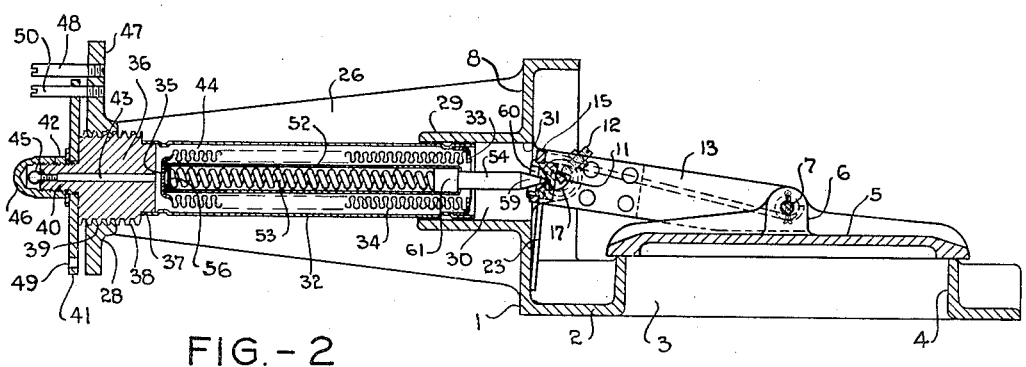
Fig. 2 is a view in vertical section on the line 2—2 of Figure 1.

The inner end of the tubular member 52 abuts or seats against the bellows head 35 and is provided with an inturned annular flange. The inner end of the tubular member 52 is closed by a disc 56 which is held against the inturned flange by the spring 53 which at its inner end abuts the disc. The thrust member 54 projects from the casing 32 and through the aperture 31, being provided with a conical end portion 59 which seats in a conical recess formed in a socket member 60 rigidly fixed in an aperture in the cross member 15. The thrust member 59 engages in the socket member at a point below the knife-edge bearings of the lever arms 13, so that outward movement of the thrust member 54 on expansion of the fluid in the chamber 44 will rotate the arms 13 counter-clockwise of Fig. 2 and lift the valve member 5 from its seat. The outer end of the tubular member 52 is preferably provided with an inwardly directed annular flange cooperating with an enlarged head portion 61 on the thrust member 54 and within the tubular member 52 to prevent movement of the thrust member completely out of the tubular member by the spring 53. It may be noted that the spacing between the indicator plate apertures 49 is such that movement of the plate 41 relative to the reference member 48 of the distance between the centers of adjacent apertures 49 will vary the response of the automatic means to temperature variation by substantially 2 degrees.

Figure 4:
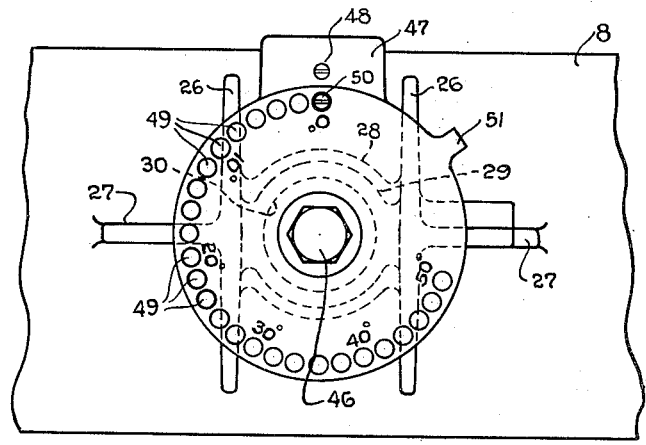
Fig. 4 is a detail view of an adjustment means forming a part of my invention.

The operation of my device is as follows, assuming the supporting member 1 to have been so positioned that the automatic means including the casing 32 is in the space to be refrigerated and the valve member 5 is operable to control flow of the refrigerating medium into the space containing the automatic means: The temperature at which it is desired to maintain the refrigerated space may be regulated by adjustment of the plate 41 after removal of the pin 50. Rotation of the plate 41 counter-clockwise of Fig. 4 will result in the maintenance of a higher temperature in the refrigerated space as this movement, due to the left-hand thread on the plug member 36, will retract the casing 32 from the sleeve member 29 as the casing is rotated, and if the valve member 5 is closed, as shown, will move the thrust member 54 out of engagement with or relieve the pressure of the thrust member on the base of the recess in the socket member 60. If, with the automatic means set to maintain a temperature of zero degrees and with the valve member 5 closed as shown, the temperature surrounding the casing 32 should rise above zero degrees, the increase in temperature will result in expansion of the fluid in the chamber 44. Expansion of the fluid will move the bellows head 35 outward, collapsing the bellows member 34 and acting through the spring 53 and thrust member 54 to move the valve member 5 toward open position. The force of the thrust member 54 acting to open the valve member is assisted by the springs 21 so that the force exerted by the expansible fluid need only overcome a part of the opposing force of gravity acting on the valve member. This renders the device more sensitive to variations in temperature, permits of a smaller and less powerful actuating element and results in more efficient operation. The resiliently supported thrust member serves as a safety means to prevent injury to the mechanism in the event that the valve member freeze in closed position or be held against movement for any other reason.

Although I have described my invention as adapted for embodiment in a refrigerating apparatus or system, it is to be noted that the invention is equally applicable for controlling flow of a heating medium.

What I claim and desire to secure by Letters Patent of the United States is:

1. A device of the character described, comprising a control means, a supporting member having a guideway, a sealed tubular casing reciprocably fitting in said guideway and having a movable end wall, an expansible fluid in said casing, a plunger projecting from one end of said casing for transmitting movement from said wall to said control means, said plunger including a spring and a thrust member resiliently supported by said spring, said spring having one end engaging said wall and having its other end engaging said thrust member, said thrust member cooperating with said control means, said spring permitting expansion of said fluid when said thrust member has reached its limit of movement, and rotary means at the other end of said casing for moving said casing relative to said control means.

2. A device of the character described, comprising a control means, a supporting member, a sealed substantially cylindrical casing reciprocably carried by said supporting member, a bellows member within and sealing one end of said casing, an expansible fluid in said casing, a plunger projecting from one end of said casing for transmitting movement from said bellows member to said control means, a plate member on said supporting member at the other end of said casing, and a screw member adjustably supported in said plate member and operable to move said casing relative to said control means.

3. A device of the character described, comprising a control means, a supporting member having a guideway, a tubular casing reciprocably fitting in said guideway, a bellows member within and closing and sealing one end of said casing, means for transmitting movement from said bellows member to said control means, an abutment member on said supporting member at the other end of said casing, a closure member sealing the other end of said casing, said closure member being adjustably supported by said abutment member and operable to move said casing relative to said control means, and an expansible fluid in said casing.

4. A device of the character described, comprising a control means, a supporting member, a tubular casing reciprocably and rotatably carried by said supporting member, an expansible member closing and sealing one end of said casing, means for transmitting movement from said expansible member to said control means, said supporting member having at the other end of said casing an internally screw-threaded aperture, an externally screw-threaded closure member adjustably threaded in said aperture, said closure member sealing the other end of said casing, and an expansible fluid in said casing.

5. A device of the character described, comprising a supporting frame having an opening therethrough, a movably supported closure member operable to close said opening, lever means operatively connected to and for moving said member, a rigid casing closed at one end and reciprocably supported by said frame, an expansible member carried by and closing and sealing the other end of said casing, a plunger for transmitting movement from said expansible member to said lever means and carried by said casing, spring means interposed between said expansible member and said plunger and carried by said casing, an expansible fluid in said casing, and a plug member closing said one casing end and having screw-threaded engagement with said frame to move said casing relative to said lever means, whereby said expansible member, spring and plunger are moved relative to said lever means.

6. A device of the character described, comprising a supporting frame having an opening therethrough, a movably supported closure member for said opening, lever means carrying said member and operable to move said member relative to said opening, a rigid casing closed at one end and reciprocably supported by said frame, an expansible member closing and sealing the other end of said casing, a plunger for transmitting movement from said expansible member to said lever means, an expansible fluid in said casing, a plug member closing said one casing end and having screw-threaded engagement with said frame to move said casing relative to said lever means, and spring means assisting movement of said closure means by said plunger.

7. A device of the character described, comprising a base member having an opening therethrough, a closure member for said opening, a flange having an aperture therethrough and projecting laterally from said base member, a bearing member projecting from one face of said flange, a lever arm pivotally supported by said bearing member and pivotally connected to said closure member, a sealed casing carried by and projecting from the other face of said flange and having a movable wall, a plunger extending through said aperture and operatively connecting said wall and said lever arm, and an expansible fluid in said casing.

8. A device of the character described, comprising a base member having an opening therethrough, a closure member for said opening, a flange projecting laterally from said base member and having an operture therethrough transverse to said opening, a sleeve member surrounding said aperture and projecting from said flange, a lever arm having a fulcrum support and pivotally connected to said closure member, a sealed tubular casing reciprocably supported in said sleeve member and having a movable wall, a plunger projecting through said aperture and operatively connecting said wall and said lever arm, and an expansible fluid in said casing.

9. A device of the character described, comprising a base member having an opening therethrough, a closure plate for said opening, a supporting flange projecting laterally from said base member, spaced lever arms, each of said arms being pivotally connected at one end of said plate, a cross member rigidly connecting the other ends of said arms, bearing members pivotally supporting said arms adjacent said cross member, spring means normally tending to move said plate toward open position, a supporting member projecting from said flange and having a guideway, a tubular casing reciprocable and rotatable in said guideway, a bellows member in said casing and closing and sealing one end thereof, an aperture in said flange registering with said guideway and said cross member, a plunger extending through said aperture and operatively connecting said bellows member and said cross member, a plug member adjustably screw-threaded in said supporting member and closing and sealing the other end of said casing, an expansible fluid in said casing, a rotatably adjustable indicator plate fixed to said plug member, and means engageable with said indicator plate to hold said plug member against movement.

10. A device of the character described, comprising a base member having an opening therethrough, a closure plate for said opening, a supporting flange projecting laterally from said base member, spaced lever arms, each of said arms being pivotally connected at one end to said plate, a cross member rigidly connecting the other ends of said arms, said arms having aligned bearing apertures adjacent said cross member, bearing members carried by said flange and extending into said apertures, spaced supporting arms projecting from said supporting flange, a sleeve member positioned between and extending longitudinally of said supporting arms and being rigid therewith, said flange having an aperture therethrough aligned with the bore of said sleeve member, a tubular casing having one end reciprocable and rotatable in said sleeve member, a bellows member within and sealed to said casing adjacent said one end, a head closing the other end of said bellows member, a tubular member within said bellows member and having one end closed and seated against said head, a helical coil spring within said tubular member and abutting said closed end, a thrust member reciprocable in said tubular member and seating against said spring, said thrust member projecting from said casing and through said flange aperture into engagement with said cross member, a member joining the free ends of said supporting arms and having an internally screw-threaded aperture therethrough, an externally screw-threaded plug member adjustably threaded in said last-named aperture and supporting and closing the other end of said tubular casing, and expansible fluid in said casing, a rotatable adjusting plate rigid with said plug member, and means cooperable with said adjusting plate to hold said plug member against movement.

11. A device of the character described, comprising a control means, a supporting member having a guideway, a hollow cylindrical casing carried by said supporting member and having one end guided in said guideway, the other end of said casing being closed and sealed, said supporting member having an aperture concentric with said casing and adjacent said other casing end, an adjustment member in said aperture and cooperable with said supporting member and said casing, said adjustment member being operable to move said casing in said guideway and relative to said control means, diaphragm means closing and sealing said one casing end, a plunger operatively connecting said diaphragm means and said control means, spring means for transmitting movement of said diaphragm to said plunger, and an expansible fluid in said casing operable to move said diaphragm means.

12. A device of the character described, comprising a base member having an opening therethrough, a closure member for said opening, a supporting flange projecting laterally from said base member, spaced lever arms carrying said closure member, a cross member rigidly connecting said arms, bearing members pivotally supporting said arms, spring means normally tending to move said closure member toward open position, a supporting member projecting from said flange and having a guideway, a tubular casing reciprocable and rotatable in said guideway, said flange having an aperture therethrough registering with said guideway, said casing having a movable wall, a plunger projecting through said aperture and operatively connecting said wall and said lever arms whereby to actuate said closure member, and an expansible fluid in said casing.

13. A device of the character described, comprising a control means, a supporting member, a tubular casing reciprocably and rotatably carried by said supporting member, an expansible member closing and sealing one end of said casing, spring means for transmitting movement from said expansible member to said control means, said supporting member having at the other end of said casing an internally screw-threaded aperture, an externally screw-threaded closure member adjustably threaded in said aperture, said closure member sealing the other end of said casing, an expansible fluid in said casing, and means cooperable with said closure member and said supporting member to hold said closure member in adjusted position.

14. A device of the character described, comprising a base member having an opening therethrough, a closure member for said opening, a flange projecting laterally from said base member and having an aperture therethrough transverse to said opening, a sleeve member surrounding said aperture and projecting from said flange, a lever arm having a fulcrum support and pivotally connected to said closure member, a sealed tubular casing reciprocably supported in said sleeve member and having a movable wall, a plunger projecting through said aperture and operatively connecting said wall and said lever arm, an expansible fluid in said casing, and means to adjust said casing longitudinally in said sleeve member to regulate the operation of said closure member by said plunger.

15. A device of the character described, comprising a control means, a supporting member, a hollow cylindrical casing carried by said supporting member, said casing having an end wall, a bellows member within and sealing said casing, a guide tube extending longitudinally of and within said bellows, a thrust member supported in said tube and projecting from said casing for transmitting movement of said bellows to said control means, said thrust member having operative connection to said control means, said control means being movable in a direction substantially transverse to the direction of movement of said thrust member, an expansible fluid in said casing, and resilient means in said tube for transmitting motion from said bellows member to said thrust member.

16. A device of the character described, comprising a control means, a supporting member having a guideway, a hollow cylindrical casing reciprocably carried by said supporting member in said guideway, said casing having an end wall, a bellows member within and sealing said casing, a guide tube extending longitudinally of and within said bellows, a thrust member slidably supported in said tube and projecting from said casing, said thrust member having operative connection to said control means, an expensible fluid in said casing, resilient means in said tube for transmitting motion from said bellows member to said thrust member, means carried by said supporting member for adjusting said casing whereby to regulate the operation of said control means, and spring means acting in conjunction with said bellows member to move said control means in one direction, said spring means exerting a force insufficient to move said control means.

17. A device of the character described, comprising a control means, a supporting member, a hollow cylindrical casing reciprocably and rotatably carried by said supporting member, a plug member closing and sealing one end of said casing, a bellows member within and sealing the other end of said casing, a guide tube extending longitudinally of and within said bellows, a thrust member supported in said tube and projecting from said casing, said thrust member having operative connection to said control means, an expansible fluid in said casing, and resilient means in said tube for transmitting motion from said bellows member to said thrust member, said plug member having screw-threaded engagement with said supporting member whereby rotation of said plug member will adjust said casing longitudinally to regulate the operation of said control means.

18. A device of the character described, comprising a base member having an opening therethrough, a closure member for said opening, a supporting flange projecting laterally from said base member, spaced lever arms, each of said arms being pivotally connected to said closure member, a cross member rigidly connecting the other ends of said arms, bearing members pivotally supporting said arms adjacent said cross member, spring means normally tending to move said closure member toward open position, a supporting member projecting from said flange and having a guideway, a tubular casing reciprocable and rotatable in said guideway, a bellows member in said casing and closing and sealing one end thereof, an aperture in said flange registering with said guideway and said cross member, a plunger extending through said aperture and operatively connecting said bellows member to said cross member, a plug member adjustably screw-threaded in said supporting member and closing and sealing the other end of said casing, and an expansible fluid in said casing, rotation of said plug member adjusting said casing whereby to regulate the operation of said closure member.

LEWIS W. EGGLESTON.

CERTIFICATE OF CORRECTION.

Patent No. 2,060,185. November 10, 1936.

LEWIS W. EGGLESTON.

It is hereby certified that error appears in the printed specification of the above numbered patent requiring correction as follows: Page 3, first column, line 20, claim 1, after the word "permitting" insert continued; same page, second column, line 44, claim 8, for "operture" read aperture; and line 59, claim 9, for "of" read to; and that the said Letters Patent should be read with these corrections therein that the same may conform to the record of the case in the Patent Office.

Signed and sealed this 19th day of January, A. D. 1937.

Henry Van Arsdale (Seal) Acting Commissioner of Patents.